United States Patent
Hanita et al.

(10) Patent No.: US 8,983,147 B2
(45) Date of Patent: Mar. 17, 2015

(54) EYELID DETECTION DEVICE

(75) Inventors: Kiyoto Hanita, Susono (JP); Yoshinao Takemae, Yokohama (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 0 days.

(21) Appl. No.: 14/131,555

(22) PCT Filed: Jul. 11, 2011

(86) PCT No.: PCT/JP2011/065824
§ 371 (c)(1),
(2), (4) Date: Jan. 8, 2014

(87) PCT Pub. No.: WO2013/008304
PCT Pub. Date: Jan. 17, 2013

(65) Prior Publication Data
US 2014/0112580 A1    Apr. 24, 2014

(51) Int. Cl.
*G06K 9/00* (2006.01)
*G06T 1/00* (2006.01)

(52) U.S. Cl.
CPC ............... *G06K 9/0061* (2013.01); *G06T 1/00* (2013.01)
USPC ............................ 382/117; 382/103; 382/118

(58) Field of Classification Search
USPC ......... 382/117, 118, 103, 165, 167, 190, 195; 351/206
See application file for complete search history.

(56) References Cited

U.S. PATENT DOCUMENTS

| 7,784,943 B2 * | 8/2010 | Adachi et al. ............... 351/206 |
| 8,224,035 B2 * | 7/2012 | Adachi et al. ............... 382/117 |
| 8,254,644 B2 * | 8/2012 | Li et al. ...................... 382/118 |
| 2008/0151186 A1 | 6/2008 | Adachi et al. ............... 351/206 |

FOREIGN PATENT DOCUMENTS

| JP | 2008-158922 | 7/2008 | |
| JP | 2012088837 | * 5/2012 | ............... G06T 7/20 |

OTHER PUBLICATIONS

Carlos H. Morimoto, et al., "Automatic Iris Segmentation using Active Near Infra Red Lighting", Computer Graphics and Image Processing, IEEE, 2005, pp. 37-43.
International Search Report issued Oct. 18, 2011, in PCT/JP11/065824 filed Jul. 11, 2011.

* cited by examiner

*Primary Examiner* — Anh Do
(74) *Attorney, Agent, or Firm* — Oblon, McClelland, Maier & Neustadt, L.L.P.

(57) ABSTRACT

An ECU which is connected to an image sensor and an illuminance sensor includes an eyelid detection unit that detects the positions of the upper and lower eyelids from a face image, an eyelid determination unit that determines the positions of the upper and lower eyelids detected by the eyelid detection unit, and an eye opening degree calculation unit that calculates the degree of eye opening. The eyelid determination unit searches for a red-eye candidate in the range in which the skin is assumed to be present from the positions of the upper and lower eyelids detected by the eyelid detection unit. When the red-eye candidate is searched in the range, the eyelid determination unit determines that the eyelid detection unit falsely detects the positions of the upper and lower eyelids.

3 Claims, 11 Drawing Sheets

EYELID DETECTION DEVICE

TECHNICAL FIELD

The present invention relates to an eyelid detection device that detects the positions of the upper and lower eyelids from a face image.

BACKGROUND ART

An eyelid detection device has been known which detects the positions of the upper and lower eyelids from a face image in order to detect, for example, an eye opening state (for example, see Patent Literature 1). The eyelid detection device disclosed in Patent Literature 1 excludes the edge of a red eye from the upper eyelid and the lower eyelid to prevent errors in the detection of the positions of the upper and lower eyelids.

CITATION LIST

Patent Literature

[Patent Literature 1] Japanese Unexamined Patent Application Publication No. 2008-158922

SUMMARY OF INVENTION

Technical Problem

However, in practice, in some cases, two or more pixel patterns which will be red-eye candidates are included in the face image.

Therefore, in the eyelid detection device according to the related art, when a pixel pattern which is not the red eye is falsely detected as the red eye, an error in the detection of the red eye occurs and the positions of the upper and lower eyelids are falsely detected.

An object of the invention is to provide an eyelid detection device which can prevent errors in the detection of the positions of the upper and lower eyelids even when a pixel pattern similar to the pixel pattern of the red eye is arranged in the vicinity of the red eye.

Solution to Problem

An eyelid detection device according to the invention includes eyelid detection means for detecting positions of upper and lower eyelids from a face image and eyelid determination means for searching for a red-eye candidate in a range in which skin is assumed to be present from the positions of the upper and lower eyelids detected by the eyelid detection means and determining that there is an error in the detection of the positions by the eyelid detection means when the red-eye candidate is searched in the range.

According to the eyelid detection device of the invention, when a pixel patter similar to the pixel pattern of the red eye is arranged in the vicinity of the red eye, the eyelid detection means is likely to falsely detect an unnecessary edge that is generated in the vicinity of the pixel pattern as the positions of the upper and lower eyelids. However, when there is a red-eye candidate in the range in which the skin is assumed to be present from the detected positions of the upper and lower eyelids, the eyelid determination means determines that there is an error in the detection of the positions by the eyelid detection means. Therefore, it is possible to prevent errors in the detection of the positions of the upper and lower eyelids.

The eyelid determination means may set the red-eye candidate search range to be equal to or less than a diameter of a red eye. According to this structure, since the eyelid determination means sets the red-eye candidate search range to be equal to or less than the diameter of the red eye, it is possible to reduce the influence of a white skin portion with a pixel value approximate to the pixel value of a red eye portion. Therefore, it is possible to clearly distinguish the red-eye candidate from the skin.

The eyelid detection device according to the invention may further include red-eye detection means for detecting a red eye from the face image. The eyelid determination means may set the red-eye candidate search range to be equal to or less than a diameter of the red eye detected by the red-eye detection means. The diameter of the red eye in the face image varies depending on the distance from a camera or the difference between individuals. Since the eyelid determination means sets the red-eye candidate search range to be equal to or less than the diameter of the red eye detected from the face image, it is possible to clearly distinguish the red-eye candidate from the skin even when the diameter of the red eye in the face image varies depending on the distance from the camera or the difference between individuals.

Advantageous Effects of Invention

According to the invention, it is possible to prevent errors in the detection of the positions of the upper and lower eyelids even when a pixel pattern similar to the pixel pattern of the red eye is arranged in the vicinity of the red eye.

DESCRIPTION OF EMBODIMENTS

Hereinafter, an eyelid detection device according to an embodiment of the invention will be described. In the drawings, the same or equivalent components are denoted by the same reference numerals and the description thereof will not be repeated.

The eyelid detection device according to this embodiment is provided in, for example, a driving support control device which estimates the degree of drowsiness of the driver from the degree of eye opening which is calculated from the positions of the upper and lower eyelids and performs vehicle driving support control. The positions of the upper and lower eyelids mean the position of the upper eyelid and the position of the lower eyelid.

Figure 1:
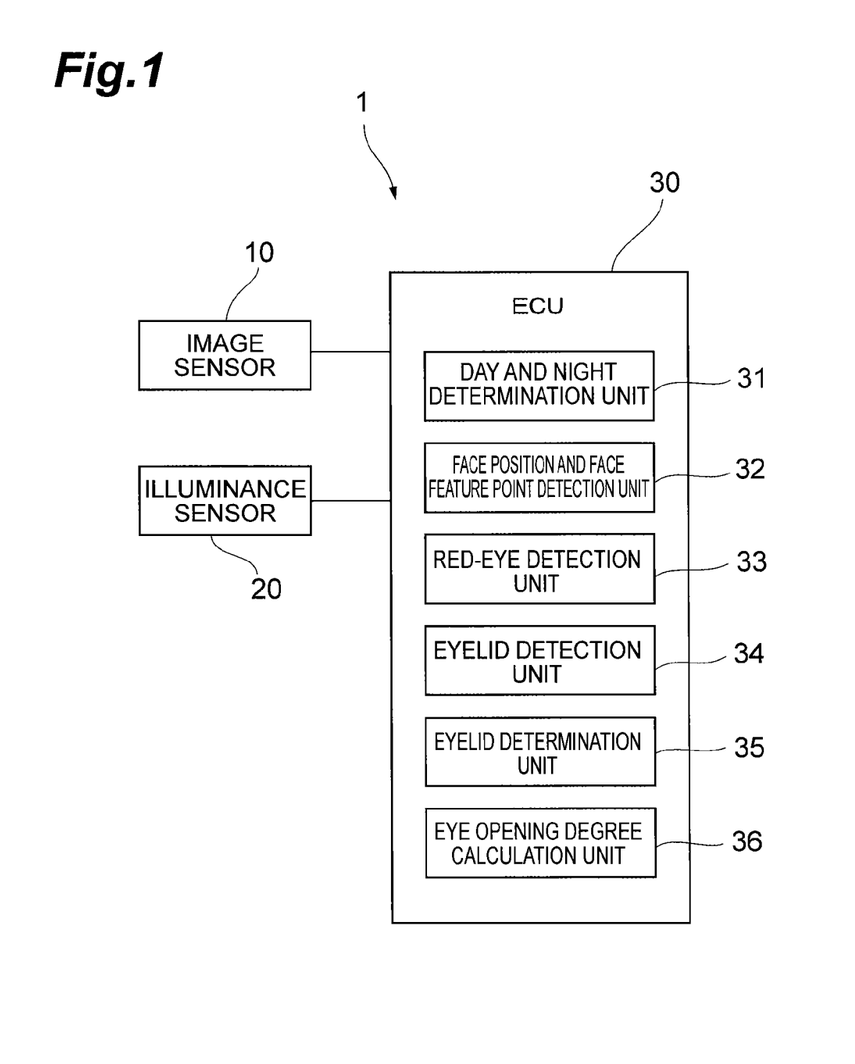
FIG. 1 is a block diagram illustrating the structure of an eyelid detection device according to an embodiment.

FIG. 1 is a block diagram illustrating the structure of the eyelid detection device according to the embodiment. As shown in FIG. 1, an eyelid detection device 1 according to the embodiment includes an image sensor 10, an illuminance sensor 20, and an electronic control unit (ECU) 30.

The image sensor 10 captures the image of the face of the driver. For example, a CCD camera which is fixed to a steering column of the vehicle is used as the image sensor 10. The image (face image) captured by the image sensor 10 includes image information indicating, for example, the position or color information of each pixel. The image sensor 10 outputs the image information of the captured image to the ECU 30.

The illuminance sensor 20 measures an out-vehicle light amount. The out-vehicle light amount means the amount of light outside the vehicle. Therefore, the amount of light outside the vehicle is large in the daytime and is small at night. For example, a photoelectric conversion element which is fixed in the vicinity of the window of the vehicle is used as the illuminance sensor 20. The illuminance sensor 20 outputs the measured amount of light outside the vehicle to the ECU 30.

The ECU 30 is a computer of a vehicle device which performs electronic control and includes, for example, a central processing unit (CPU), a memory, such as a read only memory (ROM) or a random access memory (RAM), and an input/output interface.

The ECU 30 is connected to the image sensor 10 and the illuminance sensor 20 and includes a day and night determination unit 31, a face position and face feature point detection unit 32, a red-eye detection unit 33, an eyelid detection unit 34, an eyelid determination unit 35, and an eye opening degree calculation unit 36.

The day and night determination unit 31 has a function of determining whether it is day where the amount of light outside the vehicle is large or night where the amount of light outside the vehicle is small. The day and night determination unit 31 determines whether it is day or night on the basis of, for example, the amount of light outside the vehicle which is output from the illuminance sensor 20 or the total brightness of the image which is output from the image sensor 10.

The face position and face feature point detection unit 32 has a function of detecting the feature points of the face of the driver from the image captured by the image sensor 10. Specifically, first, the face position and face feature point detection unit 32 searches for the position of the face in the entire range of the image captured by the image sensor 10 using a statistical method, such as a neural network method or a boosting method. Then, the face position and face feature point detection unit 32 sets a face position region including the searched position of the face and detects the feature points of the face from the set face position region using the statistical method, such as the neural network method or the boosting method. The feature points of the face include, for example, the outer corner of the right eye, the inner corner of the right eye, the outer corner of the left eye, the inner corner of the left eye, the center of the nasal cavity, and the left and right ends of the mouth. In addition, a method of detecting each feature point of the face is not limited to the above-mentioned method, but other known methods may be used.

The red-eye detection unit 33 has a function of detecting the red eye with template matching using a red-eye template. Specifically, first, the red-eye detection unit 33 sets a red-eye search region from the face position region set by the face position and face feature point detection unit 32, on the basis of the feature points, such as the outer corner of the eye and the inner corner of the eye detected by the face position and face feature point detection unit 32. Then, the red-eye detection unit 33 detects the red eye from the red-eye search region with the template matching using the red-eye template. A method of detecting the red eye is not limited to the above-mentioned method, but other known methods may be used.

The eyelid detection unit 34 has a function of detecting the positions of the upper and lower eyelids. Specifically, the eyelid detection unit 34 applies, for example, a Sobel filter to the face position region set by the red-eye detection unit 33 and generates an edge image which is an edge-enhanced image. Then, the eyelid detection unit 34 projects a plurality of curves which have the feature points, such as the outer corner of the eye and the inner corner of the eye detected by the face position and face feature point detection unit 32, as a starting point and an end point onto the edge image and detects the positions of the upper and lower eyelids from the strength of the edge (the pixel value of the edge image) on the curves. A method of detecting the positions of the upper and lower eyelids is not limited to the above-mentioned method, but other known methods may be used.

In addition, the eyelid detection unit 34 has a function of excluding the curve below the red eye detected by the red-eye detection unit 33 from the candidates of the upper eyelid and excluding the curve above the red eye detected by the red-eye detection unit 33 from the candidates of the lower eyelid when detecting the positions of the upper and lower eyelids.

The eyelid determination unit 35 has a function of determining the positions of the upper and lower eyelids detected by the eyelid detection unit 34. Specifically, the eyelid determination unit 35 searches for the red-eye candidates in the range in which the skin is assumed to be present from the positions of the upper and lower eyelids detected by the eyelid detection unit 34. Then, when the red-eye candidate is searched in the range, the eyelid determination unit 35 determines that the eyelid detection unit 34 falsely detects the positions of the upper and lower eyelids.

The eye opening degree calculation unit 36 has a function of calculating the degree of eye opening indicating the degree of eye opening of the driver. Specifically, the eye opening degree calculation unit 36 calculates the difference between the position of the upper eyelid and the position of the lower eyelid detected by the eyelid detection unit 34 as the degree of eye opening [pix]. The degree of eye opening is represented in a pixel unit. A method of calculating the degree of eye opening is not limited to the above-mentioned method, but other known methods may be used.

Figure 2:
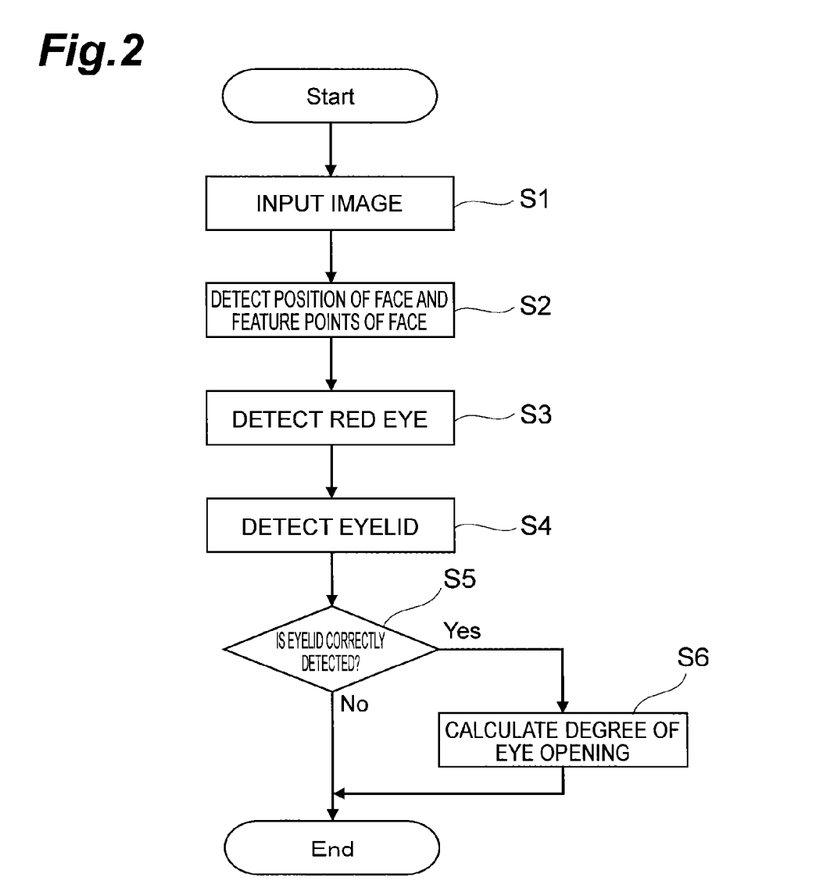
FIG. 2 is a flowchart illustrating a red eye detection process of the eyelid detection device according to the embodiment.

Next, the operation of the eyelid detection device 1 according to the embodiment will be described. FIG. 2 is a flowchart illustrating an eyelid detection process of the eyelid detection device according to the embodiment. The process shown in FIG. 2 is performed under the control of the ECU 30 at the time that is determined to be night by the day and night determination unit 31. For example, the process is repeatedly performed at a predetermined interval for the period from the time when an ignition is turned on to the time when the ignition is turned off.

Figure 3:
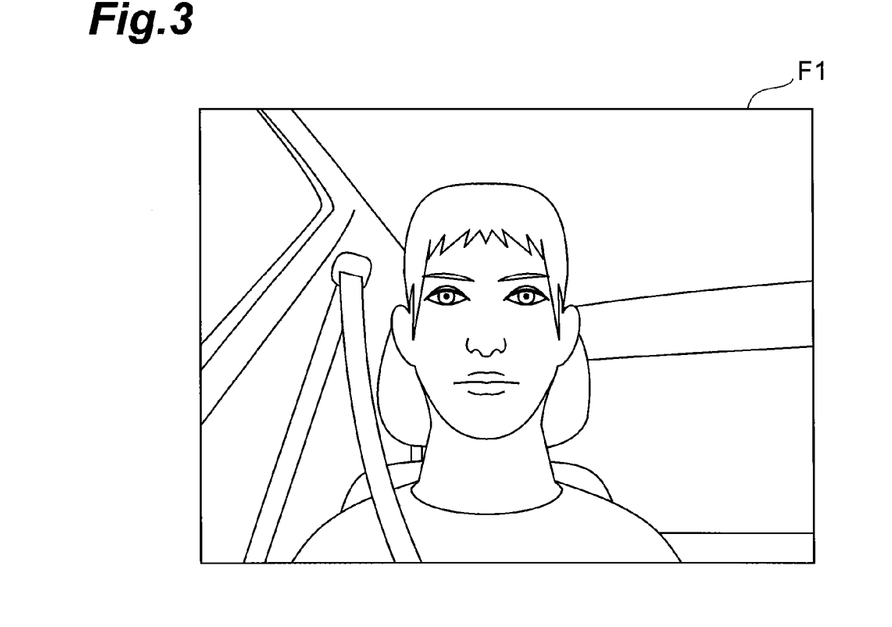
FIG. 3 is a diagram illustrating an example of image information captured by an image sensor.

As shown in FIG. 2, first, the ECU 30 inputs the image of the driver captured by the image sensor 10 (Step S1). In Step S1, the ECU 30 inputs an image F1 shown in FIG. 3 which is captured by the image sensor 10. FIG. 3 shows an example of the image captured by the image sensor.

Figure 4:
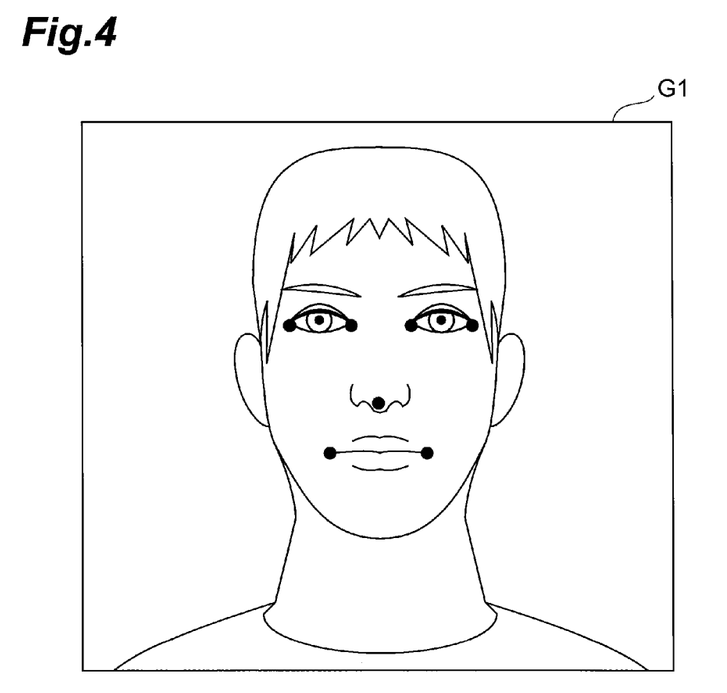
FIG. 4 is a diagram illustrating an example of a face position region.

Then, the ECU 30 detects the position of the face and the feature points of the face (Step S2). The process in Step S2 is performed by the face position and face feature point detection unit 32. First, the face position and face feature point detection unit 32 searches for the position of the face in the entire range of the image F1 input in Step S1 using the statistical method, such as the neural network method or the boosting method. Then, the face position and face feature point detection unit 32 sets a face position region G1. FIG. 4 is a diagram illustrating the outline of a face feature point detection method and shows the face position region G1. As shown in FIG. 4, the face position region G1 includes the searched position of the face and is a region of the image F1. Then, the face position and face feature point detection unit 32 detects the feature points, such as the outer corner of the right eye, the inner corner of the right eye, the outer corner of the left eye, the inner corner of the left eye, the center of the nasal cavity, and the left and right ends of the mouth, in the set face position region G1 as a search range, using the statistical method, such as the neural network method or the boosting method.

Figure 5:
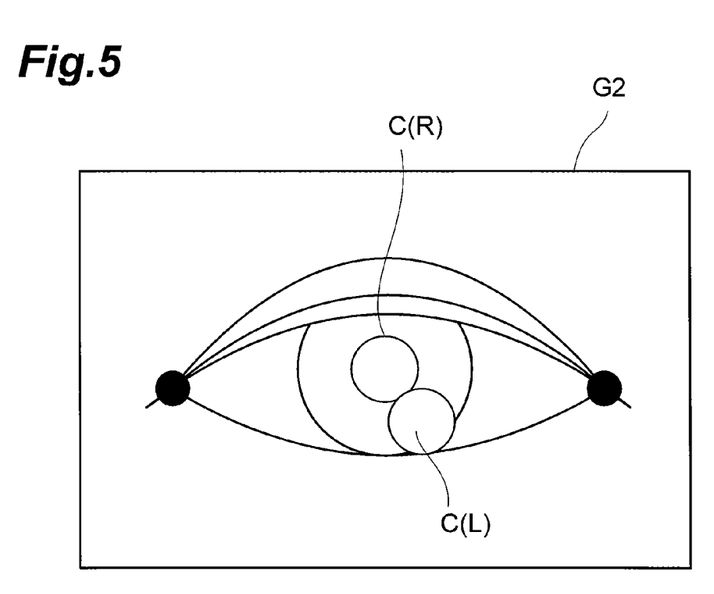
FIG. 5 is a diagram illustrating the outline of a red eye detection method.

Then, the ECU 30 detects the red eye with the template matching using the red-eye template which is prepared in advance (Step S3). The process in Step S3 is performed by the red-eye detection unit 33. First, the red-eye detection unit 33 sets a red-eye search region G2 from the face position region G1 (see FIG. 4) set in Step S2. FIG. 5 is a diagram illustrating the outline of a red eye detection method. As shown in FIG. 5, the red-eye search region G2 is a rectangular region partitioned by, for example, a segment which is arranged outside the outer corner of the eye and extends in the up-down direction, a segment which is arranged inside the inner corner of the eye and extends in the up-down direction, a segment which is arranged above a segment connecting the outer corner of the eye and the inner corner of the eye and extends in the left-right direction, and a segment which is arranged below the segment connecting the outer corner of the eye and the inner corner of the eye and extends in the left-right direction. Then, the red-eye detection unit 33 performs template matching for the red-eye search region G2 using the red-eye template which is prepared in advance to detect a red-eye candidate C. In addition, the red-eye detection unit 33 detects a pixel pattern that is greater than a predetermined threshold value as the red-eye candidate C using the template matching.

As shown in the red-eye search region G2 of FIG. 5, LED light L reflected from the eye or eyelid of the driver is included in the red-eye search region G2. When the driver wears glasses, the LED light L reflected from the frames or lenses of the glasses is also included in the red-eye search region G2. The pixel pattern of the LED light L is similar to the pixel pattern of the red eye R. Therefore, the red-eye detection unit 33 detects the true red eye R as the red-eye candidate C and also detects the LED light L as the red-eye candidate C. As a result, in Step S3, two red-eye candidates C are detected. The red-eye detection unit 33 determines the red-eye candidate C with the pixel pattern which is best matched with the red-eye template to be the red eye R.

Then, the ECU 30 detects the position of the upper eyelid and the position of the lower eyelid (Step S4). The process in Step S4 is performed by the eyelid detection unit 34.

Figure 6:
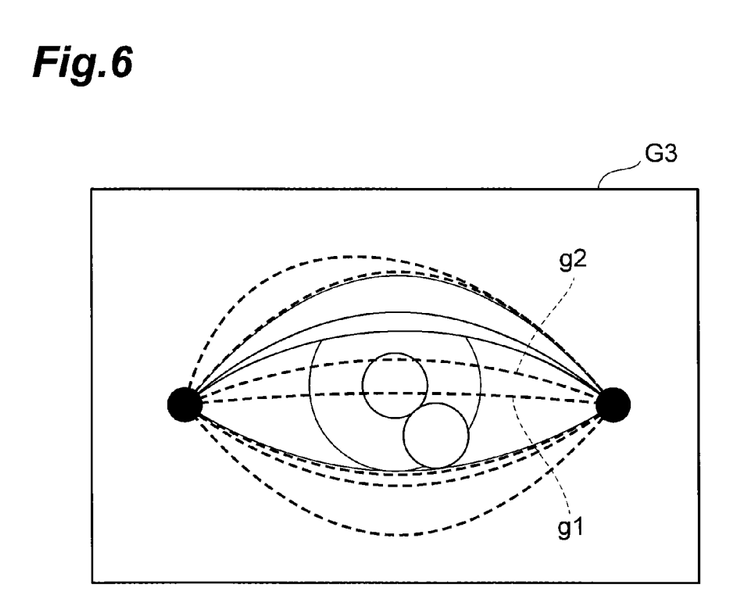
FIG. 6 is a diagram illustrating the outline of a method of detecting the upper and lower eyelids.

Next, a method of detecting the upper and lower eyelids in Step S4 will be described with reference to FIG. 6. FIG. 6 is a diagram illustrating the outline of the method of detecting the upper and lower eyelids. As shown in FIG. 6, the eyelid detection unit 34 applies, for example, the Sobel filter to the face position region G1 set in Step S2 to generate an edge image G3 which is an edge-enhanced image. Then, the eyelid detection unit 34 projects a plurality of curves which have the feature points, such as the outer corner of the eye and the inner corner of the eye detected in Step S2, as a starting point and an end point to calculate the strength of the edge (the pixel value of the edge image) on the curves. For example, a Bézier curve is used as the curve. Then, the eyelid detection unit 34 selects the curves with high edge strength from the calculated edge strength and uses the selected curves as an upper eyelid curve Q1 indicating the position of the upper eyelid and a lower eyelid curve Q2 indicating the position of the lower eyelid. In this case, the eyelid detection unit 34 excludes the curve (for example, a curve q1) below the red eye (below the central position of the red eye) detected in Step S3 from the candidates of the upper eyelid and excludes the curve (for example, a curve q2) above the red eye (above the central position of the red eye) detected in Step S3 from the candidates of the lower eyelid.

Then, the ECU 30 determines whether the detection of the positions of the upper and lower eyelids by the eyelid detection unit 34 in Step S4 is correct (Step S5). The process in Step S5 is performed by the eyelid determination unit 35.

Figure 7:
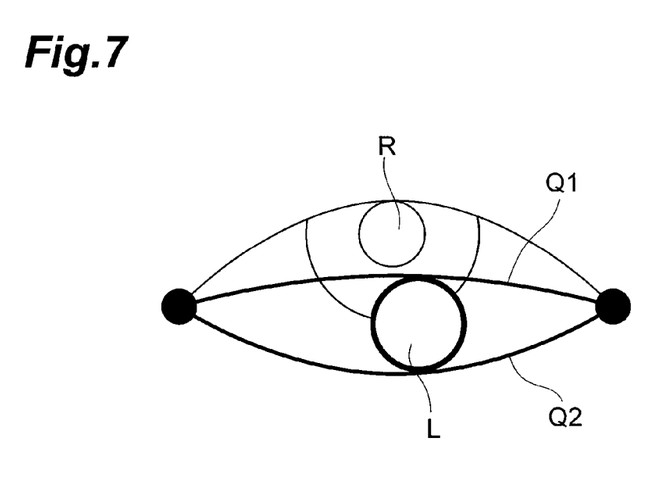
FIG. 7 is a diagram illustrating the outline of an error in the detection of the positions of the upper and lower eyelids.

Next, an example of an error in the detection of the positions of the upper and lower eyelids in Step S4 will be described with reference to FIG. 7. FIG. 7 is a diagram illustrating the outline of the error in the detection of the positions of the upper and lower eyelids. As shown in FIG. 7, when the LED light L is included in the red-eye search region G2, an unnecessary edge is generated in the vicinity of the boundary of the pixel pattern of the LED light L. Then, the edge strength of the curve projected onto the edge which is generated in the vicinity of the boundary of the pixel pattern of the LED light L increases. Therefore, the eyelid detection unit 34 is likely to falsely detect the curve projected onto the edge which is generated in the vicinity of the boundary of the pixel pattern of the LED light L as the upper eyelid curve Q1 or the lower eyelid curve Q2. As shown in FIG. 7, the lower eyelid curve Q2 indicates the curve projected onto the lower eyelid and the upper eyelid curve Q1 indicates the curve which is not projected onto the upper eyelid, but is projected onto the edge generated in the vicinity of the boundary of the pixel pattern of the LED light L. Therefore, the LED light L which is falsely detected exists between the upper eyelid curve Q1 and the lower eyelid curve Q2 and the true red eye R exists above the upper eyelid curve Q1.

First, the eyelid determination unit 35 searches for the red-eye candidates in the range in which the skin of the upper and lower eyelids is assumed to be present from the upper eyelid curve Q1 and the lower eyelid curve Q2.

Figure 8:
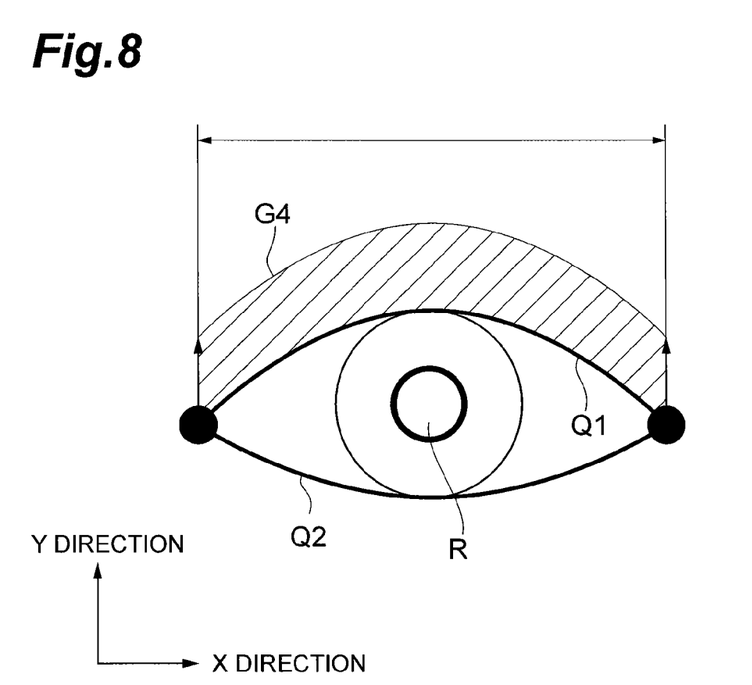
FIG. 8 is a diagram illustrating the outline of a red-eye candidate search method.
Figure 9:
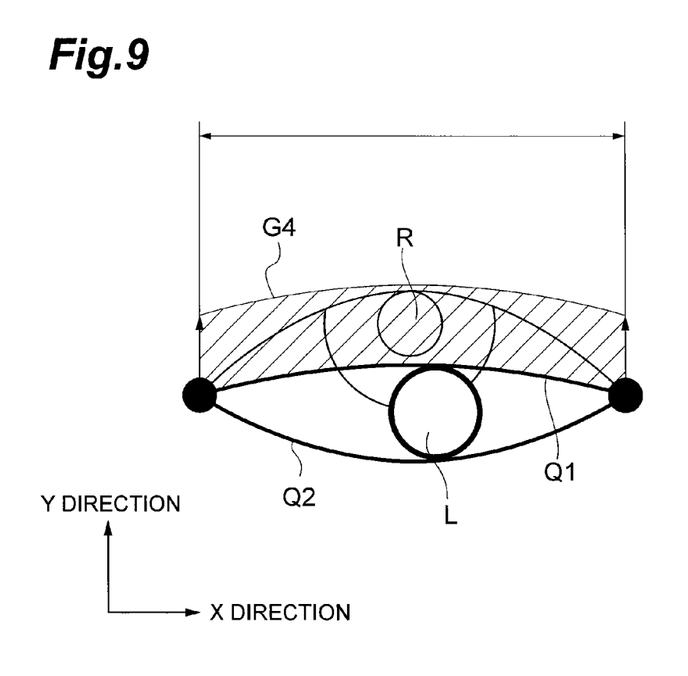
FIG. 9 is a diagram illustrating the outline of the red-eye candidate search method.

Next, a method of searching for the red-eye candidates in Step S5 will be described in detail with reference to FIGS. 8 and 9. FIGS. 8 and 9 are diagrams illustrating the outline of the method of searching for the red-eye candidates. FIG. 8 shows a case in which the positions of the upper and lower eyelids are correctly detected and FIG. 9 shows a case in which the position of the upper eyelid is falsely detected.

As shown in FIGS. 8 and 9, first, the eyelid determination unit 35 sets, as a search range G4, a predetermined range in which the skin of the upper and lower eyelids is assumed to be present from the upper eyelid curve Q1 and the lower eyelid curve Q2 which are detected in Step S4. The search range G4 extends a distance that is equal to or less than the diameter of the red eye from the upper eyelid curve Q1 and the lower eyelid curve Q2. Therefore, the eyelid determination unit 35 sets a range which extends a distance that is equal to or less than the diameter of the red eye upward (in the Y direction) from the upper eyelid curve Q1 as the search range G4 of the upper eyelid curve Q1. In addition, the eyelid determination unit 35 sets a range which extends a distance that is equal to or less than the diameter of the red eye downward (in a direction opposite to the Y direction) from the lower eyelid curve Q2 as the search range G4 of the lower eyelid curve Q2.

For example, when the diameter of the red eye R is a maximum of 10 pixels, the search range G4 of the upper eyelid curve Q1 extends a distance corresponding to 10 pixels or less upward from each pixel of the upper eyelid curve Q1 and the search range G4 of the lower eyelid curve Q2 extends a distance corresponding to 10 pixels downward from each pixel of the lower eyelid curve Q2. In this case, the search range G4 of the upper eyelid curve Q1 may include only the pixels on the upper eyelid curve Q1 and the search range G4 of the lower eyelid curve Q2 may include only the pixels on the lower eyelid curve Q2. FIGS. 8 and 9 show only the search range G4 of the upper eyelid curve Q1 and do not show the search range G4 of the lower eyelid curve Q2.

Figure 10:
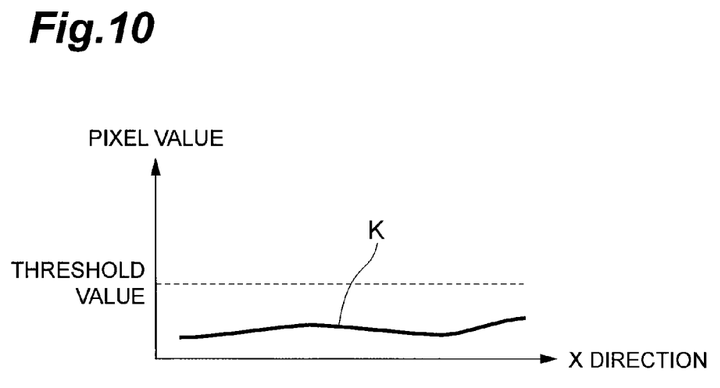
FIG. 10 is a diagram illustrating the distribution of pixel values in the X direction in the case of FIG. 8.
Figure 11:
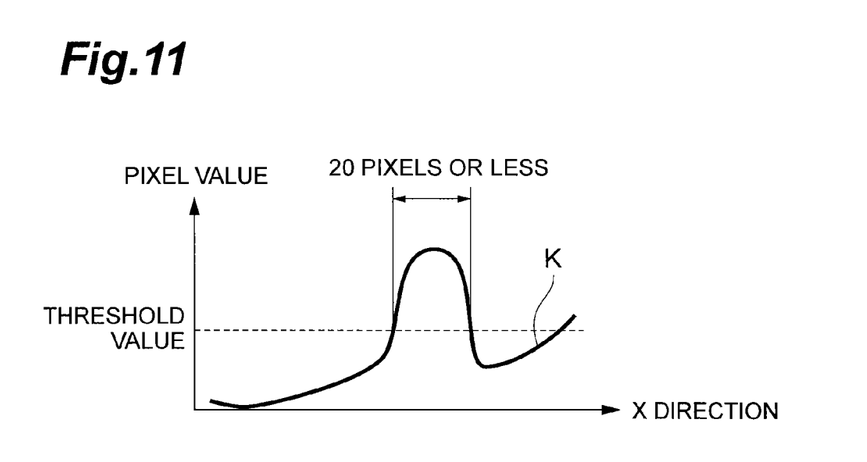
FIG. 11 is a diagram illustrating the distribution of the pixel values in the X direction in the case of FIG. 9.

Then, the eyelid determination unit 35 adds the values of one or a plurality of pixels with the same X coordinates in the search range G4 of the upper eyelid curve Q1. In addition, the eyelid determination unit 35 adds the values of one or a plurality of pixels with the same X coordinates in the search range G4 of the lower eyelid curve Q2. Then, as shown in FIGS. 10 and 11, the eyelid determination unit 35 generates the distribution of the added pixel value K in the X direction. FIG. 10 is a diagram illustrating the distribution of the pixel values in the X direction in the case of FIG. 8. FIG. 11 is a diagram illustrating the distribution of the pixel values in the X direction in the case of FIG. 9. In FIGS. 10 and 11, the pixels of a red eye portion or the pixels of a white skin portion have a large pixel value K and the pixels of a dark shadow portion in the vicinity of the eyelid have a small pixel value K.

As shown in FIGS. 8 and 10, when the eyelid detection unit 34 correctly detects the positions of the upper and lower eyelids, the search range G4 is occupied by the dark shadow portion in the vicinity of the eyelid. Therefore, the distribution of the pixel values K in the X direction is not greater than a predetermined threshold value, but is represented as a flat curve. On the other hand, as shown in FIG. 11, when the eyelid detection unit 34 falsely detects the position of the upper eyelid, the pixel value of the true red eye R is large and the distribution of the pixel values K in the X direction is represented as a curve in which a portion corresponding to the red eye R is a convex portion that is greater than a predetermined threshold value. The predetermined threshold value is between the pixel value of the red-eye portion and the pixel value of the dark shadow portion in the vicinity of the eyelid. For example, an intermediate value between these pixel values is used as the predetermined threshold value.

Then, the eyelid determination unit 35 determines whether the red-eye candidate is in the search range G4 on the basis of whether there is a portion greater than the predetermined threshold value in the distribution of the pixel values K in the X direction and whether the width of the convex portion greater than the predetermined threshold value is equal to or less than the maximum width of the red eye. The maximum width of the red eye can be measured in advance and is set to, for example, 20 pixels.

Then, when the distribution of the pixel values K in the X direction does not satisfy the above-mentioned conditions, the eyelid determination unit 35 determines that there is no red-eye candidate in the search range G4 and determines that the eyelid detection unit 34 correctly detects the positions of the upper and lower eyelids. On the other hand, when the distribution of the pixel values K in the X direction satisfies the above-mentioned conditions, the eyelid determination unit 35 determines that there is a red-eye candidate in the search range G4 and determines that the eyelid detection unit 34 falsely detects the positions of the upper and lower eyelids.

When it is determined in Step S5 that the eyelid detection unit 34 correctly detects the position of the upper eyelid and the position of the lower eyelid (Step S5: YES), the ECU 30 calculates the degree of eye opening (Step S6). The process in Step S6 is performed by the eye opening degree calculation unit 36. The eye opening degree calculation unit 36 calculates the Y coordinates of the midpoints of the upper and lower eyelid curves Q1 and Q2 which are detected in Step S4 and calculates the degree of eye opening [pix] on the basis of the difference between the Y coordinates of the upper and lower eyelids. The degree of eye opening is represented in a pixel unit. A method of calculating the degree of eye opening is not limited to the above-mentioned method, but other known methods may be used. Then, the eyelid detection process ends.

On the other hand, when it is determined in Step S5 that the eyelid detection unit 34 falsely detects the position of the upper eyelid and the position of the lower eyelid (Step S5: NO), the ECU 30 does not calculate the degree of eye opening and notifies other processing devices that the eyelid detection unit 34 has failed in detecting the positions of the upper and lower eyelids or that the reliability of the positions of the upper and lower eyelids detected by the eyelid detection unit 34 is low. In this case, since the possibility that the red-eye detection unit 33 will fail in detecting the red eye is very high, the ECU 30 notifies other processing devices that the red-eye detection unit 33 has failed in detecting the red eye or that the reliability of the red eye detected by the red-eye detection unit 33 is low. Then, the eyelid detection process ends.

As described above, according to the eyelid detection device 1 of this embodiment, for example, when the LED light L with a pixel pattern similar to the pixel pattern of the red eye R is disposed in the vicinity of the red eye R, the eyelid detection unit 34 is likely to falsely detect an unnecessary edge which is generated in the vicinity of the pixel pattern of the LED light L as the positions of the upper and lower eyelids. However, when there is a red-eye candidate in the range in which the skin is assumed to be present from the detected positions of the upper and lower eyelids, the eyelid determination unit 35 determines that the eyelid detection unit 34 falsely detects the position. Therefore, it is possible to prevent errors in the detection of the positions of the upper and lower eyelids.

Since the range in which the eyelid determination unit 35 searches for the red-eye candidates is equal to or less than the diameter of the red eye, it is possible to reduce the influence of a white skin portion with a pixel value approximate to the pixel value of a red-eye portion. Therefore, it is possible to clearly distinguish the red-eye candidate from the skin.

In addition, since the range in which the eyelid determination unit 35 searches for the red-eye candidates is equal to or less than the diameter of the red eye detected by the red-eye detection unit 33, it is possible to clearly distinguish the red-eye candidate from the skin even when the diameter of the red eye in the image varies depending on the distance from the image sensor 10 or the difference between individuals.

The eyelid determination unit 35 determines whether there is a red-eye candidate in the search range G4 on the basis of whether there is a portion greater than a predetermined threshold value in the distribution of the pixel values K in the X direction. Therefore, it is possible to appropriately determine whether there is a red-eye candidate in the search range G4.

The eyelid determination unit 35 determines whether there is a red-eye candidate in the search range G4 on the basis of whether the width of the portion greater than the predetermined threshold value in the distribution of the pixel values K in the X direction is equal to or less than the maximum width of the red eye. Therefore, it is possible to appropriately determine whether the portion greater than the predetermined threshold value is caused by the white skin or the red-eye candidate.

The exemplary embodiment of the invention has been described above. However, the invention is not limited to the above-described embodiment. For example, the eyelid detection unit 35 sets a range that is equal to less than the diameter of the red eye as the red-eye candidate search range. However, the eyelid detection unit 35 may set a range that is greater than the diameter of the red eye as the red-eye candidate search range as long as it can appropriately detect the red-eye candidate from the search region G4.

Industrial Applicability

The invention can be used as an eyelid detection device including eyelid detection means for detecting the position of the upper eyelid and the position of the lower eyelid from a face image.

REFERENCE SIGNS LIST

1: EYELID DETECTION DEVICE
10: IMAGE SENSOR
20: ILLUMINANCE SENSOR
30: ECU
31: DAY AND NIGHT DETERMINATION UNIT
32: FACE POSITION AND FACE FEATURE POINT DETECTION UNIT
33: RED-EYE DETECTION UNIT (RED-EYE DETECTION MEANS)
34: EYELID DETECTION UNIT (EYELID DETECTION MEANS)
35: EYELID DETERMINATION UNIT (EYELID DETERMINATION MEANS)
36: EYE OPENING DEGREE CALCULATION UNIT
F1: FACE IMAGE
G1: FACE POSITION REGION
G2: RED-EYE SEARCH REGION
G3: EDGE IMAGE
G4: SEARCH RANGE
R: RED EYE
L: LED LIGHT
C: RED-EYE CANDIDATE
Q1: UPPER EYELID CURVE
Q2: LOWER EYELID CURVE

The invention claimed is:

1. An eyelid detection device comprising:
an eyelid detection unit configured to detect positions of upper and lower eyelids from a face image; and
an eyelid determination unit configured to search for a red-eye candidate in a range in which a skin is assumed to be present from the positions of the upper and lower eyelids detected by the eyelid detection unit and determining that there is an error in the detection of the positions by the eyelid detection unit when the red-eye candidate is searched in the range.

2. The eyelid detection device according to claim 1, wherein the eyelid determination unit sets the red-eye candidate search range to be equal to or less than a diameter of a red eye.

3. The eyelid detection device according to claim 1, further comprising:
a red-eye detection unit configured to detect a red eye from the face image,
wherein the eyelid determination unit sets the red-eye candidate search range to be equal to or less than a diameter of the red eye detected by the red-eye detection unit.

* * * * *